L. Pierson,
Soldering Clamp.
N° 28,901.            Patented June 26, 1860.
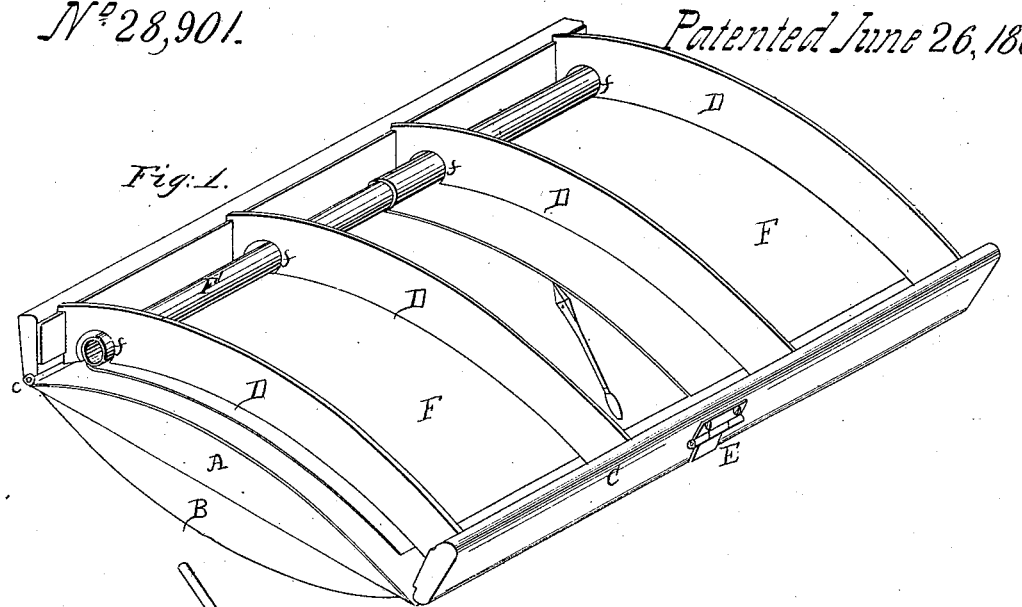
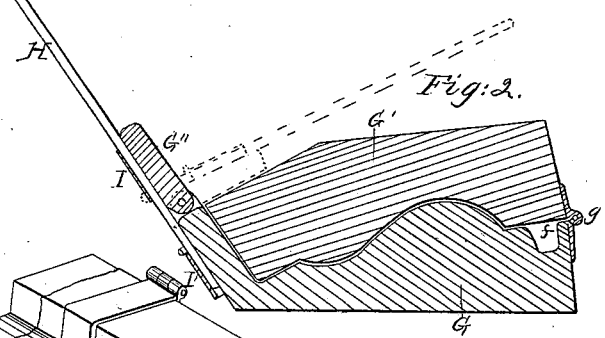
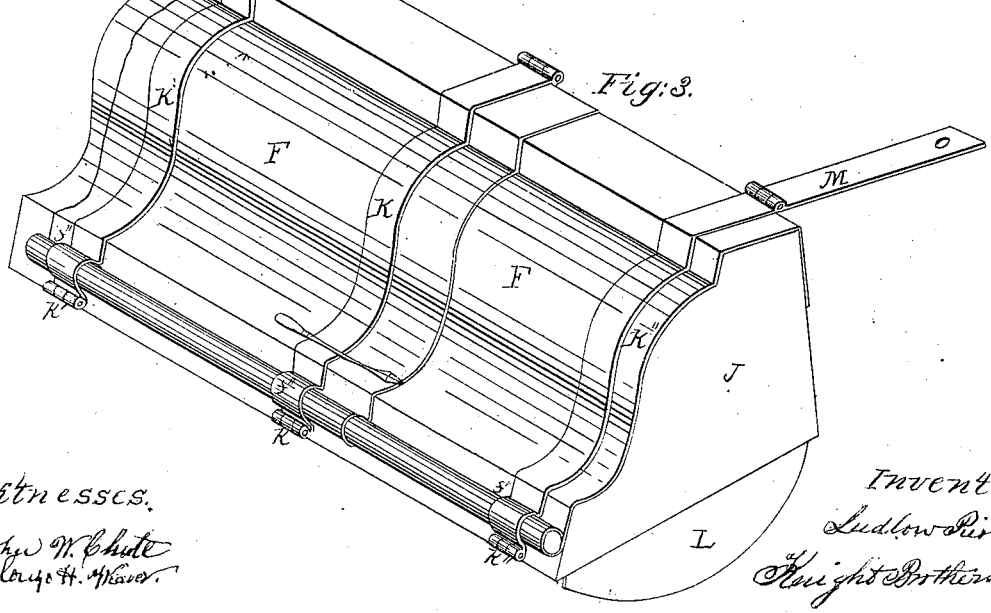
Witnesses.
John W. Chute
Alonzo H. Weaver
Inventor.
Ludlow Pierson
Knight Brothers Atty

UNITED STATES PATENT OFFICE.

LUDLOW PIERSON, OF JEFFERSONVILLE, INDIANA.

IMPROVEMENT IN MAKING EAVES-TROUGHS.

Specification forming part of Letters Patent No. 28,901, dated June 26, 1860.

*To all whom it may concern:*

Be it known that I, LUDLOW PIERSON, of Jeffersonville, Clarke county, Indiana, have invented a new and useful Machine for Forming Eaves-Troughs; and I hereby declare the following to be a full and exact description of the construction and operation of the same, reference being had to the accompanying drawings, making part of this specification.

My invention consists in the provision of a series of clamps for the more perfect and expeditious soldering and crimping of sheet-metal eaves-troughs.

In the accompanying drawings, Figure 1 is a perspective view of a device to enable the soldering together of the individual sheets, and which I call the "first-soldering clamp." Fig. 2 represents by transverse section a device to enable the crimping of a number of sheets so joined, and called the "crimping-clamp." Fig. 3 is a perspective view of my "finishing-clamp" for the final soldering together of sets of sheets which have been joined and crimped as aforesaid.

Description of the first-soldering clamp, Fig. 1: A is a block of rectangular horizontal section and having a cylindrical upper surface. This block rests upon rockers B. C is a frame hinged at $c$ to one edge of the block A, and having a set of ribs, D, curved to correspond with the cylindrical surface of the block A, and notched at $f'$ to admit the bead F', which is usually formed upon one edge of the "tin" F. One or more of these ribs may be adapted to be shifted laterally. E are catches by which the frame C is held down so as to clamp the tin. F represents sheets of tin properly placed and secured for soldering. A soldering-bit in position is shown by red lines. The clamp-block A should be composed of wood, to avoid chilling the solder, and may be about ten feet long. The ribbed frame C D may be of "malleable" iron. In case it should be desired to solder the inside of the trough, a groove may be provided for the bead F' in the substance of the block.

Description of the forming or crimping clamp, Fig. 2: G G' are two blocks of cast-iron, formed on their meeting surfaces to correspond with the lateral convolutions desired for the eaves-trough. These blocks are hinged together at $g$, and the lower block, G, has hinged to its free edge a jaw, G'', adapted, after closure of the blocks, to fold over the edge of block G', and thus complete the crimping of the tin. H is a lever, which occupies staples I I' in the blocks G G', and affords a means of closing the clamp, which being effected, the said lever is withdrawn from the staple I', to enable the above-mentioned folding of the jaw. $f'$ is a notch to admit the bead of the tin. A convenient length for this clamp is about ten feet.

Description of the finishing-clamp, Fig. 3: J is a block corresponding to the form of the finished trough. K K' K'' are jaws which are of corresponding shape and are hinged to the block at $k$ $k'$ $k''$, one of them, K, near the middle of the block, and the others, K' and K'', near its ends. L are rockers similar to those on the preparative block or first-soldering clamp, Fig. 1. M are catches to secure the jaws K in their closed position. The jaws K are bent outwardly at $f'''$, to admit the bead of the tin.

Operation: 1. The first soldering. The frame or jaw C D being elevated, two or more sheets, $t$ $t$, are laid (with their edges overlapping) on the block A, and the ribs D being adjusted to come nearly opposite the lap or joint, the jaw C D is brought down and fastened. This action bends the sheets of tin tightly and snugly down one upon the other and upon the block, the act of bending obliterating all waves or puckers in the tin. The clamp being then so turned on its rockers as to bring one side of its top surface to a nearly horizontal position, the solder is applied by means of a bit in the ordinary way, and the clamp is gradually rolled or canted over as the bit advances, to facilitate the flow of the solder.

2. The crimping. For crimping, a series of soldered sheets is placed on the block G, with the bead in the recess $f$, and the blocks G G' are then closed together, the lever H occupying the staples J' when necessary. The lever, then being withdrawn from the staple, J' is employed to fold the jaw G' down, and thus form the final crimp.

3. The final soldering is effected by taking two sets of tin which have been soldered and crimped as above, and placing them so that their ends overlap upon the block J a little to one side of the central jaw, K. The three jaws are then secured over the tin, and the soldering is effected in a manner precisely similar to that described for the first soldering.

I claim as new and of my invention herein—

1. The combination of block A, rocker B, and jaw C c D, the whole being constructed and operating substantially as set forth.

2. The crimping-clamp composed of the hinged blocks G G', jaw G'', lever H, and staples I I'.

3. The final-soldering clamp J K L M, constructed and operating as herein explained.

In testimony of which invention I hereunto set my hand.

LUDLOW PIERSON.

Witnesses:
   GEO. H. KNIGHT,
   C. STEEMER, Jr.